United States Patent [19]

Morris et al.

[11] Patent Number: 4,522,268
[45] Date of Patent: Jun. 11, 1985

[54] PACKER WHEEL

[75] Inventors: George H. Morris; Douglas C. Nicholls, both of Yorkton, Canada

[73] Assignee: Morris Rod Weeder Co. Ltd., Yorkton, Canada

[21] Appl. No.: 447,414

[22] Filed: Dec. 6, 1982

[51] Int. Cl.³ .................... A01C 7/20; A01C 13/00
[52] U.S. Cl. ..................... 172/518; 301/63 DD; 172/538
[58] Field of Search ............ 301/63 DD; 172/519, 172/518, 538, 539, 537; 111/85

[56] References Cited

U.S. PATENT DOCUMENTS

| 1,378,876 | 5/1921 | Lachman | 301/63 DD |
| 1,444,224 | 2/1923 | Wagner | 172/537 X |
| 1,602,630 | 10/1926 | White | 301/63 DD |
| 2,355,941 | 8/1944 | Ash | 301/63 DD |
| 3,033,135 | 5/1962 | Gouin | |
| 3,228,485 | 1/1966 | Ten Pas | 111/85 |
| 3,752,237 | 8/1973 | Hornung | 172/538 |

FOREIGN PATENT DOCUMENTS

| 1112109 | 11/1981 | Canada . | |
| 59480 | 6/1938 | Norway | 301/63 DD |

Primary Examiner—Richard J. Johnson
Attorney, Agent, or Firm—Schmidt, Johnson, Hovey & Williams

[57] ABSTRACT

Peripheral strengthening of double dished packer wheels used in connection with seeding implements is accomplished by providing a rigid connection for a strong, rigid annulus between the dish-shaped sides of the wheels.

16 Claims, 6 Drawing Figures

U.S. Patent   Jun. 11, 1985   4,522,268
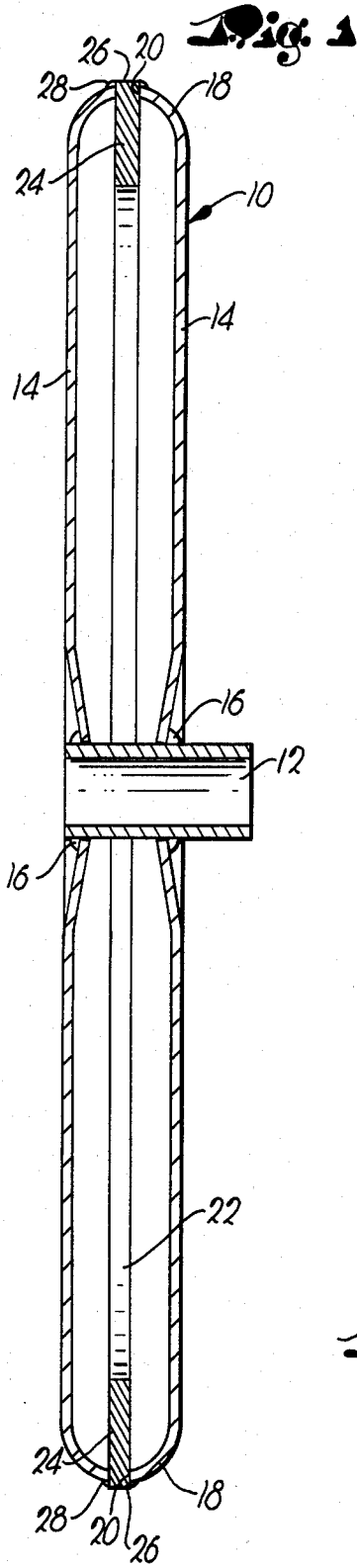
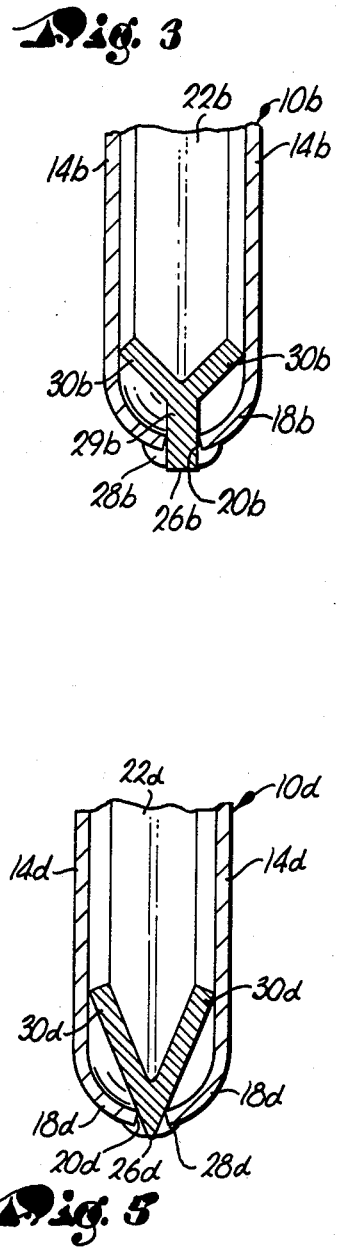
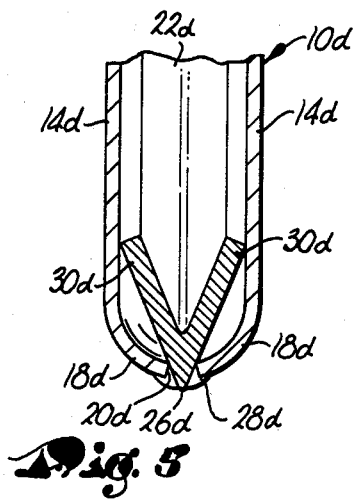
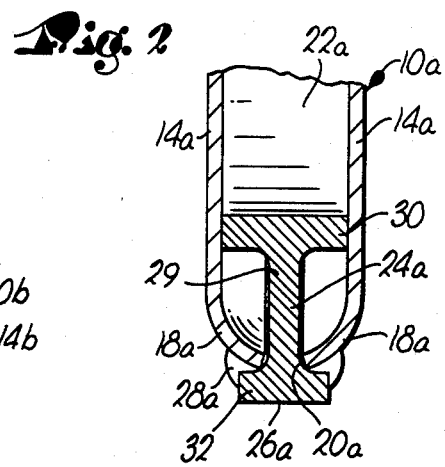
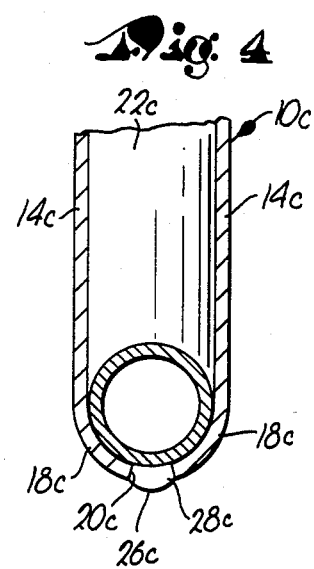
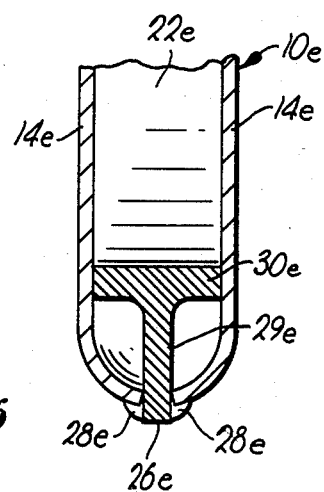

PACKER WHEEL

The present invention relates to improvements in double dished packer wheels. The packer wheel, sometimes referred to as press wheel, is used on seeding machinery to press soil over and around seeds which have been laid in the soil by the seed planting portion of the machine. Our improvements over previously constructed packer wheels have to do with strengthening the periphery of the wheel to withstand forces coming from rocks and other obstacles which bend or fracture the outer rim of the wheel, such improvements also contributing to greater wear life of the wheel. Yet another benefit of our improved construction is that it lends itself to be fabricated in a simple and cost efficient manner. More particularly, a third member is welded between the two dish portions of the packer wheel at its circumference.

While packer wheels are used primarily on agricultural seeding machinery, they may be found in other industries used in the transplanting of seedlings or to compact other material.

One type is the solid spoked wheel disclosed in U.S. Pat. No. 3,033,135. Another is a rubber rimmed wheel disclosed in Canadian Pat. No. 1,112,109. On the other hand, the instant invention relates to that type of wheel which is fabricated from two circular, dish-shaped parts or sides which are joined together at their circumference, and by some means, at the hub. This results in a substantially, thick, hollow bodied wheel.

The two sides may be dished according to various configurations. Some packer wheels have sharply curved portions at the circumference while others have gradually curved circumferential portions. Other packer wheels of this type have their dished parts made in a conical shape, and most packer wheels of this type have at least a portion of the two dished parts parallel with one another. Regardless of the variety of shapes they have common problems.

A major problem with the two piece hollow dished packer wheel is that its circumference is often bent inwardly when a rock or other hard obstacle is encountered. After extensive use in rocky conditions the wheel can become heavily dented to the extent of becoming out of round. This often leads to the wheel breaking apart. It also results in pressing the soil or material in a very uneven manner due to the irregular circumference.

Yet another problem is wear on the circumference. Even in ideal conditions the circumference of the wheel will wear when the packer wheel is used for long periods of time. If the machine with the packer wheel is transported on a road surface for a long distance, using the packer wheel as a transport wheel, the wear problem is greatly increased. Excessive wear will remove the weld which joins the two dished parts. This will result in wheel splitting. Excessive wear will also reduce the thickness of the packer wheel material at the periphery making it even easier to be indented by an obstacle.

Another problem occurs when a large rock or obstacle is forced between a pair of packer wheels. The wheel will be bent to the side or dented on its side. The bent portion of the wheel will not track properly and will cause the soil or material to be pressed in an uneven manner.

There have been at least three methods of attempting to solve the packer wheel problems. One suggestion has been to use a very thick material to fabricate the round dished portions of the packer wheel, and to weld the dished portions together with a heavier weld. This, however, is costly because much more material is used, more welding is done and more expense is needed to shape the dished portions of the wheel.

Another method has been to build one of the dished parts slightly smaller than the other so that one will fit into the other. When they are assembled and welded the two dished portions overlap, increasing the amount of material at the periphery of the wheel. This does help somewhat to increase the wear life, increase the bending strength and increase the wheels ability to resist denting. However, such construction has failed to solve the problems; the packer wheels continue to wear, bend and dent in rough conditions. There is also additional manufacturing cost because two different dished portions have to be made.

Another attempt to correct the problems consists of welding a V-shaped band around the circumference of the wheel. The band increases the amount of wear material at the periphery of the wheel making it more difficult to dent or bend sideways. However, this remedy is very costly and it is subject to dent or bend because of large forces applied by obstacles.

The present invention contemplates welding an annulus between the dish-shaped side plates to greatly increase the sectional modulus of the periphery of the packer wheel and to resist great bending or denting loads as well as increase the wear life of the wheel.

FIG. 1 is a central, transverse, cross-sectional view of a packer wheel made in accordance with one form of our present invention;

FIGS. 2–6 are fragmentary, cross-sectional views similar to FIG. 1 showing modified forms of the packer wheel of our instant invention.

In FIG. 1 of the drawing, a press or packer wheel 10 has a central hub 12 circumscribed by a pair of spaced, dish-shaped, sheet metal sides 14 in concentric relationship thereto and rigidly secured to the hub 12, as by welding 16. The sides 14 are provided with continuous, outermost, arcuate, inturned margins 18 which terminate in opposed, continuous, circular edges 20 disposed in spaced, facing relationship.

A rigid, relatively thin, ring-like or washer-like strengthening annulus or perforated plate 22 of metallic material disposed between the sides 14, medially thereof, in surrounding relationship to the hub 12, has a pair of opposed, flat faces 24 between the edges 20 in engagement with the latter. The annulus 22 is, however, otherwise spaced from the sides 14 and extends radially outwardly beyond the margins 18 to present an outwardly-facing, ground-engaging, annular rim or periphery 26 concentric to the hub 12. The inside diameter of the annulus 22 is somewhat optional and could be plate-like and engage and/ or be secured to the hub 12 if desired, but should be appreciably stronger than the sides 14, and need not extend outwardly an appreciable distance beyond the edges 20.

The annulus 22 and the sides 14 are rigidly united adjacent the peripheral rim 20 by a pair of exterior beads 28 of weld material completely and uninterruptedly surrounding the margins 18, one at each face 24 respectively of the annulus 22 and preferably flush with the rim 20, functioning to interconnect the faces 24 with the margins 18 along the edges 20, thereby presenting a closed, hollow wheel 10 housing substantially all of the annulus 22 therewithin radially inwardly of the edges 20.

In FIG. 2 of the drawing, a wheel 10a is provided with sides 14a having margins 18a, terminating in edges 20a as in the case of the wheel 10. A circular, transversely I-shaped, strengthening annulus 22a has a continuous web portion 29 disposed between the edges 20a, the latter engaging flat, opposed faces 24a of the web 29.

A first, continuous, band-like, flanged portion 30 integral with the web portion 29 and disposed entirely within the wheel 10a between the sides 14a in engagement with the inner faces of the sides 14a maintains the sides 14a in spaced parallelism along the flange portion 30. A second, continuous, band-like flanged portion 32 integral with the web portion 29 is disposed entirely outside the wheel 10a in surrounding relationship thereto along the edges 20a in continous engagement with the margins 18a. The flanged portion 32 has a flat, outwardly-facing, ground-engaging, annular rim or periphery 26a concentric to the axis of rotation of the wheel 10a and, as noted, appreciably wider than the rim 26.

The annulus 22a and the sides 14a are rigidly united adjacent the flange portion 32 by a pair of exterior beads 28a of weld material completely and uninterruptedly surrounding the margins 18a, one at each margin 18a respectively, inwardly of the flange portion 32 and overlapping portions of the flange portion 32. The beads close the circumference of the wheel 10a along the edges 20a such that the wheel 10a houses the flange portion 30 and substantially all of the web 29 inwardly of the edges 20a, the connection manifestly being between the flange portion 32 and the margins 18a throughout the circumferences of both.

In FIG. 3 of the drawings, a packer wheel 10b is provided with sides 14b having margins 18b, terminating in edges 20b, and a circular, transversely Y-shaped annulus 22b as associated with the wheel 10b in a manner quite similar to the arrangement of annulus 22a in FIG. 2. Web portion 29b of the annulus 22a, disposed between and in engagement with the edges 20b, terminates in a rim 26b. Weld beads 28b are located much the same as beads 28 in FIG. 1. A pair of continuous flanged portions 30b within the wheel 10b and integral with the web portion 29b engage the inner faces of the sides 14b, functioning the same as the flange portion 30 in FIG. 2.

In FIG. 4 of the drawings, a wheel 10c has entirely housed therein a continuous, circular strengthening annulus 22c. The tubular annulus 22c is preferably cylindrical in cross section such that a portion of its outer surface is in mating engagement with the inner concave surfaces of the margins 18c of the sides 14c. A continuous bead 28c of weld material fills the gap between edges 20c of the margins 18c and connects such edges 20c with the annulus 22c therearound. The outer circumference of the bead 28c presents a continuous, circular, transversely convex, ground-engaging rim 26c.

In FIG. 5 of the drawings, a transversely V-shaped strengthening annulus 22d is housed substantially entirely within wheel 10d such that its flanges or wings 30d hold sides 14d in spaced parallelism, essentially the same as in FIG. 3. The annulus 22d protrudes outwardly through the wheel 10d at its apex 26d, the latter presenting a ground-engaging rim which, of course, is without appreciable width, contrasting with rims 26, 26a, 26b and 26c. The rim 26d is aligned with a central plane-located midway between sides 14d.

Radially inwardly of the apex 26d the annulus 22d is engaged by spaced edges 20d of arcuate margins 18d, and continuous beads 28d of welding material join each margin 18d with opposite faces of the annulus 22d exteriorly of the wheel 10d, such beads 28d also closing the space between edges 20d.

If FIG. 6 of the drawings, an annulus 22e for reinforcing the sides 14e of wheel 10e is T-shaped to present a rim 26e comparable to rims 26 and 26b as well as a web 29e and a flanged portion 30e similar to the embodiment of FIG. 2. Moreover welding beads 28e are provided in much the same manner as beads 28, 28b and 28d.

Among the several illustrated modifications above described, perhaps the simplest and most economical is that depicted by FIG. 1, the extension of the annulus 22 beyond the sides 14 providing easily accessible areas for the welding 28. Such protrusion also provides a substantial wear surface at the periphery of the wheel 10, protecting the thinner walled sides 14 from excessive wear. The rim surface 26 also increases the wear life of the welded beads or seams 28. The use of an annulus 22 of the kind shown in FIG. 1 is quite adequate as a practical solution of the problems hereinabove outlined.

If a radial load is applied to the packer wheels 10 or 10e, the annulus 22 and the annulus 22e increase the sectional modulus of the periphery of the wheels. They also increase the sectional modulus of the wheels if a load is applied parallel to the rotational axes of the hubs 12 of the wheels at their peripheries.

On the other hand, the annulus 22e has a greater sectional modulus than that of the annulus 22 when resisting side loads. But in all forms of our invention greater side loads are resisted than has ever been made possible prior to the instant invention.

We claim:

1. A packer wheel comprising:
 a central hub;
 a pair of spaced, relatively thin, dish-shaped, generally parallel sheet metal sides having continuous, outermost, inturned margins terminating in opposed, continuous, circular edges disposed in spaced, facing relationship,
 said margins converging inwardly and being transversely arcuate, presenting outermost convex surfaces and cancave innermost surfaces,
 each side having the margin and the edge thereof integral therewith,
 said sides being in circumscribing engagement with the hub and being welded directly thereto in concentric relationship thereto;
 a rigid, strengthening annulus of metallic material disposed between said sides medially thereof in surrounding relationship to the hub, said annulus in its entirety being spaced from the hub, and being supported solely by said margins,
 said annulus having a continuous, annular periphery proximal to said edges and concentric to the hub;
 weld means rigidly uniting the annulus and the sides adjacent said periphery and said edges, and extending radially outward from said margins; and
 a peripheral, outwardly extending, ground-engaging, blunt, ground-packing wear rim bearing the load carried by said wheel against the ground,
 said weld means continuing uninterruptedly throughout the circumference of said sides.

2. The invention of claim 1, said annulus being ring-like, being disposed between said edges in engagement therewith, and extending radially outwardly beyond said sides, presenting said rim, the sides being otherwise spaced from the annulus.

3. The invention of claim 2, said annulus having a pair of opposed faces, said weld means joining both faces of the annulus with said margins exteriorly thereof throughout the outer circumferences of said margins.

4. The invention of claim 1, said annulus being I-shaped, presenting a web portion disposed between said edges in engagement therewith, a first flanged portion disposed between the sides and a second flanged portion disposed exteriorly of said margins.

5. The invention of claim 4, said weld means joining the second flanged portion with both of said margins exteriorly thereof throughout the circumference of said margins.

6. The invention of claim 5, said sides being in continuous engagement with said first flanged portion.

7. The invention of claim 1, said annulus being Y-shaped, presenting a web portion disposed between said edges in engagement therewith and a pair of flanged portions disposed between said sides.

8. The invention of claim 7, said web portion having a continuous, ground-engaging rim.

9. The invention of claim 8, said sides being in continuous engagement with said flanged portions.

10. The invention of claim 1, said annulus being tubular.

11. The invention of claim 10, said weld means interconnecting the edges therebetween and extending radially outwardly beyond the edges, presenting said rim.

12. The invention of claim 11, said annulus being completely housed between said sides in mating engagement with said margins.

13. The invention of claim 1, said annulus being V-shaped and being disposed between said edges in engagement therewith.

14. The invention of claim 13, said annulus having a ground-engaging rim at the apex thereof.

15. The invention of claim 1, said annulus being T-shaped, presenting a web portion disposed between said edges in engagement therewith and a flanged portion disposed between said sides and holding the same in spaced parallelism.

16. The invention of claim 15, said web portion having a continuous, ground-engaging rim encircling the hub exteriorly of the wheel.

* * * * *